Oct. 3, 1972  S. E. ROSS  3,695,967
METHOD OF PREPARING AIR-PERMEABLE LAMINATE
Filed Dec. 16, 1970
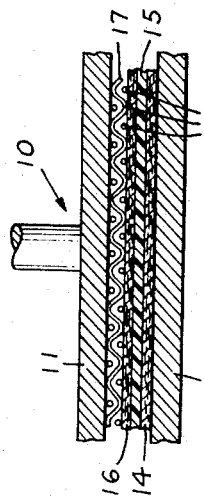
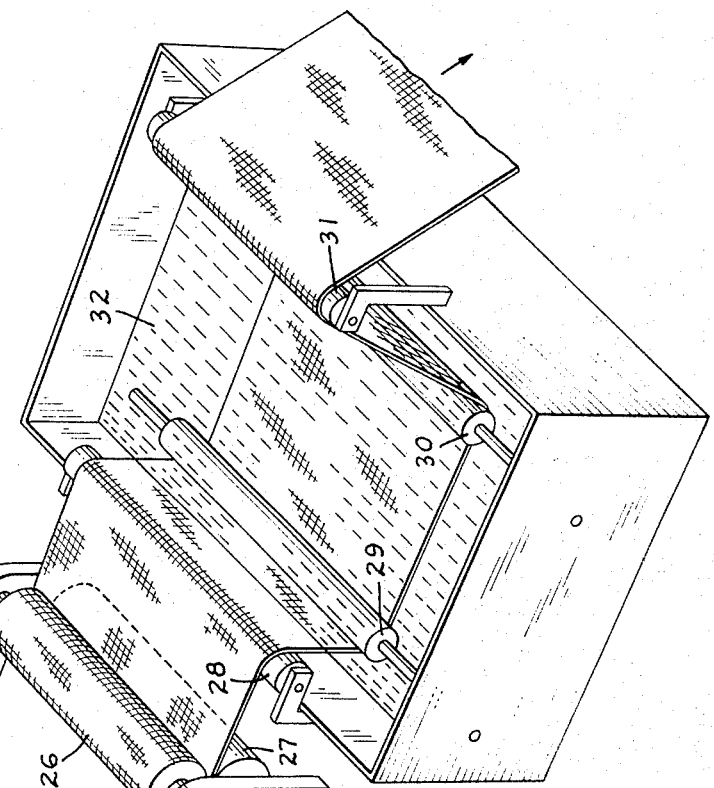
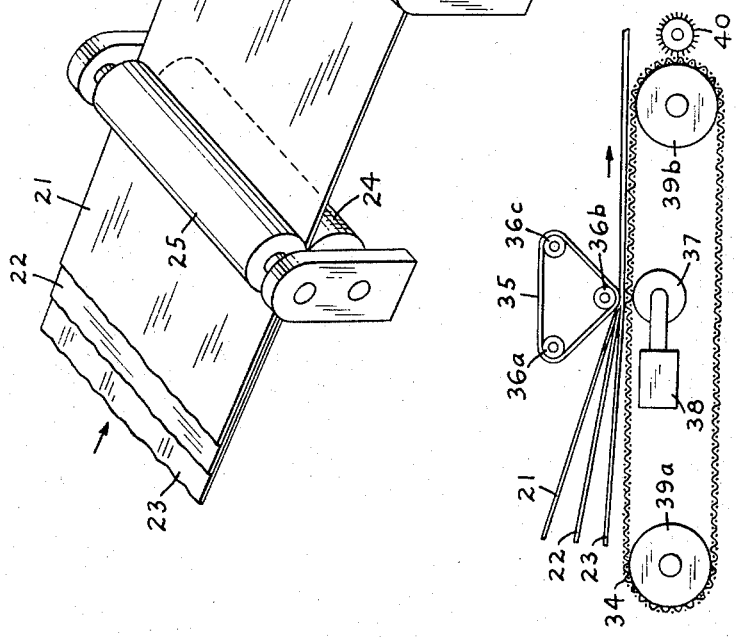
INVENTOR
STANLEY E. ROSS
BY
Charles Stein
ATTORNEY United States Patent Office 3,695,967
Patented Oct. 3, 1972

3,695,967
METHOD OF PREPARING AIR-PERMEABLE LAMINATE
Stanley E. Ross, Passaic, N.J., assignor to
J. P. Stevens & Co., Inc., New York, N.Y.
Filed Dec. 16, 1970, Ser. No. 98,810
Int. Cl. B32b 3/10
U.S. Cl. 156—209
11 Claims

ABSTRACT OF THE DISCLOSURE

An air-permeable laminated material is prepared by bonding one or more layers of fibrous material to a thermoplastic film. The bonding step is carried out by subjecting an assembly of the above components to pressure while heating at a temperature and for a period of time sufficient to perforate the thermoplastic film and simultaneously bond it to the fibrous material. One or more of the surfaces applying pressure has a multiplicity of closely spaced raised areas thereon. The laminated product is a fabric-like material useful in the production of textile articles such as clothing, industrial fabrics and home furnishing fabrics.

---

This invention relates to an air-permeable laminate prepared by bonding one or more layers of fibrous material to a thermoplastic film.

Heretofore laminated structures have been prepared by combining a thermoplastic film with one or more layers of fibrous nonwoven material at elevated temperatures and under pressure applied by means of relatively smooth surfaces, whereby the thermoplastic film greatly increases the strength of the nonwoven material. While such laminates have found considerable use, they are not acceptable in many applications because they are generally impervious to air and have a hard, stiff hand.

French Pat. 1,505,092, issued Oct. 30, 1967, discloses the preparation of air-permeable laminates from impermeable thermoplastic film and fibrous nonwoven materials. The French patent indicates that to obtain a permeable product, it is necessary that a procedure be followed wherein:

(1) A fibrous constituent is deposited on only one surface of the film so that heat and pressure can be applied directly to the film.
(2) The weight of the film is kept at a small value compared to the weight of the fibrous material.
(3) Temperatures and pressure conditions are used which will disperse fibers through the entire thickness of film.

Using this procedure it is not possible to obtain a laminate having fibrous surfaces on both sides, which is required for many textile uses and there are limitations on the strength increases which can be imparted to the nonwoven material because of the relatively small amount of thermoplastic film which can be used.

The French patent also discloses the preparation of permeable laminates by using perforated thermoplastic film. However, this requires the additional step of perforating the film and the laminated product has a hard, stiff hand. Further, the laminating step tends to close the perforations.

In accordance with the present invention, a laminated material which is air-permeable and, where desired, possesses a relatively soft hand is provided by bonding an assembly of a thermoplastic film and at least one fibrous layer. Preferably the laminate has fibrous surfaces and is obtained by laminating a nonwoven fibrous layer/thermoplastic film/nonwoven fibrous layer assembly. Lamination of the assembly is carried out by pressing it with at least one surface which has a multiplicity of closely spaced raised areas, while heating the assembly so that at least a portion of the thermoplastic film is raised to a temperature above its softening point.

The surface or surfaces having raised areas thereon are heated prior to and/or during the pressing step. At the raised areas of the pressure surface there is higher heat transfer to the assembly and a geater pressure exerted on the assembly. As a result, openings are formed in the thermoplastic film giving a permeable product. Additionally, bonding generally does not take place in all areas giving an effect similar to spot bonding and the raised areas of the pressure surface impress a pattern into the laminate. In the case of a screen-like design on the pressure surface, the pattern impressed on the laminate gives a woven appearance. Generally, the exposed surfaces of the fibrous layers are kept substantially free of thermoplastic material so that fibrous surfaces can be obtained. Another aspect of this invention is the treatment of the laminate with a hot liquid to obtain a softer hand and better drape where desired.

The invention will be more readily understood when the following detailed description is read in conjunction with the accompanying drawings.

FIG. 1 is a cross-sectional view illustrating the preparation of the laminates of this invention from a fibrous layer/film/fibrous layer assembly in a press with the pressure surface having raised areas being provided by means of a metal screen inserted between one of the pressure plates and the assembly.

FIG. 2 is a perspective view of an apparatus for carrying out the present invention in a continuous fashion.

FIG. 3 is a schematic drawing of another apparatus for carrying out the present invention in a continuous fashion.

Referring now to FIG. 1, there is shown a press 10 having press plates 11 and 12, both of which can be heated. In the press is an assembly of nonwoven fibrous sheet 14, thermoplastic film 15 and nonwoven fibrous sheet 16. A metal screen 17 is positioned between sheet 16 and pressure plate 11, the wire intersections on the underside of the screen providing a multiplicity of areas 18 raised in the direction of the assembly.

To prepare the laminate of the present invention, pressure plates 11 and 12 are heated to a temperature above the melting point of thermoplastic film 15 and the press is closed, forcing screen 17 into sheet 16. The apparatus is maintained in this position for a sufficient time to at least soften those areas of the thermoplastic film 15 which are in the closest proximity to the raised areas 18 of the screen.

FIG. 2 shows an apparatus for continuously carrying out the method of the present invention, including an optional step to improve the hand and drape of the laminated product. An assembly of nonwoven sheets 21 and 23, and thermoplastic film 22 are fed between pressure rolls 24 and 25. Roll 24, which has a metal surface, is engraved in the pattern of a woven screen and is heated to a temperature above the melting point of the thermoplastic film. Roll 25 is unheated and is covered with a compressible material. A laminated product is produced which is patterned on its lower surface. This laminate is forwarded to a second set of pressure rolls which are similar to the first set except that the heated engraved roll 26 contacts the upper surface of the laminate and resilient roll 27 contacts the previously patterned lower surface of the laminate. After passage through the second set of rolls, both surfaces of the laminate are patterned. The laminate is then immersed in a hot bath 32 by means of guide rolls 28, 29, 30, and 31.

FIG. 3 shows another apparatus for continuously carrying out the method of the present invention utilizing a continuous belt 34 of metal screen to provide the surface having raised areas. An assembly of nonwoven sheets 21 and 23 and thermoplastic film 22 is fed between the metal screen belt 34 and belt 35 which as a relatively smooth surface of compressible material. Belt 35 is rotated by rolls 36a, 36b, and 36c. Metal screen belt 34 is rotated by rolls 39a and 39b and is heated by heated roll 37 and heater 38. The surface of belt 34 is cleaned by rotating brush 40. An additional advantage of this apparataus is that the patterned pressure surface can be cleaned at a point remote from the laminated product. The laminate produced by the apparatus of FIG. 3 is patterned on only one side. If desired, the other side can be patterned by passing the laminate through a second apparatus of similar construction with the smooth side of the laminate in contact with the metal screen belt.

The layers of fibrous material employed in the present invention can be the same or different and are preferably in the form of nonwoven, self-supporting sheets which can be wet laid such as paper, or dry laid such as carded webs. Laminates can also be made where the fibrous layers are not self-supporting until the thermoplastic film is dispersed therein as binder. The fibers of the fibrous layers can be made of a wide variety of natural and synthetic materials and blends thereof with a few of the many suitable materials being cotton, rayon, wool, polyester, polyamides, polypropylene and acrylic polymers.

The thermoplastic film can be made of many different thermoplastic materials. Examples of a few of the many suitable thermoplastics are: polyethylene, chlorinated polyethylene, polyvinyl chloride, polypropylene, ethylene vinylacetate copolymer and blends thereof. Also, there can be used multicomponent films such as films containing two or more layers of different thermoplastics. The thermoplastic film is selected so that the desired softening can be accomplished during the heating and pressing step without causing any substantial damage to the fibrous layers being used. The term thermoplastic film as used herein is intended to include not only conventional thermoplastic films, but films of materials which soften when heated to moderate temperatures and then, usually by activation of a crosslinking agent, permanently harden when heated to high temperatures.

Pressure is applied to the assembly to the laminated by any suitable pressure means comprising opposed surfaces, such as the plates of a press, pressure rolls, two opposed continuous belts, a roll and a continuous belt, etc. At least one of the surfaces pressing upon the assembly has a multiplicity of closely spaced raised areas. This can be in the form of an embossed or engraved pattern or a member such as a screen inserted between the assembly and another pressure means. While the assembly is being pressed, heat is applied at a temperature at least as high as the melting point of the thermoplastic film and the duration of the simultaneous application of heat and pressure is such that the thermoplastic film is softened in at least those areas most closely positioned to the raised areas of the pressure applying surface. If desired, heating can be continued until the entire film softens. Heat may be supplied directly or indirectly to the pressure means, but at least a portion of the heat applied to the thermoplastic film is supplied by heating the surface having a multiplicity of raised areas. As a result, those portions of the thermoplastic film pressed by the raised areas of the pressure surface are subjected to both greater pressure and greater heat transfer than other portions of the thermoplastic film. The combination of differential heating and pressure causes openings to form in the thermoplastic film, thus rendering the laminated product air-permeable.

The pressure employed should be sufficiently high to cause the raised areas of the pressure surface to impress a pattern into the adjacent surface of the laminate, i.e., form compacted points on the surface. It is preferred to use a pressure of about 100 to 1000 p.s.i. but lower and higher pressure may be used. Generally, there is stronger bonding between the laminate components located beneath the points of compaction. Best results are obtained when there are at least 25 points of compaction per square inch of surface. Thus, when a screen pattern is used as the embossing means, it should preferably be equivalent to 5-mesh or higher.

Both surfaces of the laminate can be simultaneously patterned by providing a raised pattern on both pressure applying surfaces. A laminate having both surfaces patterned can also be obtained by laminating the assembly so as to apply a pressure surface having raised areas to only one side of the laminate and then subjecting the laminate to a second heat and pressure step similar to the first only pressing the other side of the laminate with a surface having raised areas. It has been found that laminates prepared by this two-step procedure possess greater physical strength than laminates of similar materials having one side patterned or having both sides patterned simultaneously.

The laminated product can be varied to some degree by changing the compressibility of one or both of the pressure surfaces. For instance, in the apparatus of FIG. 1 a compressible sheet material such as cardboard or plastic foam can be inserted between screen 17 and pressure plate 11 and/or between nonwoven sheet 14 and pressure plate 12, and in the apparatus of FIG. 2, rolls 25 and 27 can be covered with materials of different compressibility.

While it is preferred to have a fibrous surface on both sides of the laminate, it is necessary for some purposes to have a fibrous surface on only one side. Such products can be produced by the present invention by omitting one of the fibrous layers from the procedures illustrated in the drawings. The resulting two-layer assembly is subjected to heat and pressure as previously described with only the fibrous layer being contacted by a pressure surface having a multiplicity of closely spaced, raised areas thereon. Thus, for instance, a two-layer laminate can be produced with the apparatus shown in FIG. 3 by omitting nonwoven layer 21. The resulting laminate has a fibrous surface on one side and thermoplastic material with apertures therethrough on the other side.

It is also possible to use the laminates of the present invention as components in building up laminates having more than three layers. Thus, for instance, a three-layer laminate of the type described above can be bonded to a two-layer laminate of the type described above by applying heat and pressure to an assembly of these two laminates.

The laminate can be treated to improve its hand and drape characteristics by contacting the laminate with a hot liquid, such as water or an organic liquid, maintained at a temperature at least as high as the temperature at which the thermoplastic film begins to soften. The results are particularly good when the liquid swells the fibers of the nonwoven material. For instance, outstanding hand or feel is obtained when a laminate prepared from nonwoven webs of rayon is softened wth hot water and when a laminate prepared from nonwoven webs of polyester is softened with a hot aqueous emulsion containing one or more esters of a phthalic acid.

The following examples are given to further illustrate the invention, but it is to be understood that the invention is not to be limited in any way by the details described therein.

In the examples, the test procedures employed are as follows:

Tensile strength: measured on Instron Tester Model TM with a rate of extension of 100% per minute using test samples 5 inches long by 1 inch wide. Units are lbs./in.

Elongation at break (percent): measured from stress-strain curve as determined by above-described tensile strength procedure.

Modulus: measured from stress-strain curve as determined by above-described tensile strength procedure. Units are lbs./in.

Toughness: measured from stress-strain curve as area under the curve. Units are in.lbs./in$^2$.

Tear strength: ASTM D2263-65T. Units are lbs.

Air permeability: ASTM D737-66. Units are cu. ft./sq. ft./min.

Flexural rigidity: ASTM D1388-64. Units are mg. cm.

EXAMPLE 1

A 1-mil film of ethylene vinylacetate copolymer was placed between two 0.5 oz./yd.$^2$ air laid, random webs consisting of a 60/40 blend of 3 and 1.5 denier rayon fibers 1 9/16 inches in length. Two 60-mesh woven metal screens were placed on the outside layers and the whole structure placed between two pieces of cardboard on the platen of a press heated to 240° F. A pressure of 800 p.s.i. was applied to the structure for a period of 10 seconds. An air-permeable, flexible laminate was produced. Tensile strength of the laminate was 4.4 lbs./in. in the machine direction and 4.6 lbs./in. in the cross direction. Elongations at break were 7.4% and 6.5% respectively.

EXAMPLE 2

The procedure of Example 1 was repeated except that a metal screen was placed only on the top of the structure during the application of pressure. The product was then removed from the press, turned over, and a pressure of 800 p.s.i. was re-applied for 10 seconds with the screen again on top; and the press again heated to 240° F. Tensile strength of the products produced in this manner by the two-step process were 6.4 lbs./in. and 6.9 lbs./in. in the machine and cross directions, respectively. Elongations at break were 12.0% and 13.0% respectively.

EXAMPLE 3

The procedures described in Example 1 (one step) and Example 2 (two step), were carried out using 0.5 oz./yd.$^2$ polyester air laid, random webs prepared from 3-denier, 1½ in. staple fibers and 1-mil film of ethylene vinyl-acetate copolymer. The platen temperature was 240° F., the pressure was 800 p.s.i., and the time was 10 seconds. In addition to the 60-mesh screens of Examples 1 and 2, products were also prepared utilizing 20-mesh and 40-mesh screens.

The following table summarizes typical results of tensile and tear tests:

TABLE FOR EXAMPLE 3

| Screen | Tensile strength (lbs./in.) | | Tear strength (trapezoid-lbs.) | | Toughness (in. lbs./in.) | |
|---|---|---|---|---|---|---|
| | Machine | Cross | Machine | Cross | Machine | Cross |
| 20 (1 step) | 3.8 | 3.5 | 2.2 | 2.1 | .34 | .26 |
| 40 (1 step) | 5.1 | 5.3 | 2.9 | 3.6 | .50 | .51 |
| 60 (1 step) | 7.5 | 6.4 | 5.1 | 5.3 | .90 | .52 |
| 20 (2 step) | 8.4 | 8.5 | 7.9 | 7.8 | 1.50 | 1.60 |
| 40 (2 step) | 10.0 | 9.8 | 11.9 | 7.0 | 2.10 | 2.00 |
| 60 (2 step) | 10.4 | 12.7 | 11.3 | 10.4 | 2.10 | 2.90 |

EXAMPLE 4

The procedures of Examples 1 and 2 were carried out using 0.5 oz./yd.$^2$ random web produced from 3-denier 1½ inch polyester staple fibers and 1-mil polyethylene film. The platen temperature used was 260° F.

Tensile and trapezoid tear strengths of the structures are as follows:

| Screen | Tensile strength (lbs./in.) | | Tear strength (trapezoid-lbs.) | |
|---|---|---|---|---|
| | Machine | Cross | Machine | Cross |
| 20 (1 step) | 2.5 | 1.9 | 0.5 | 1.0 |
| 40 (1 step) | 3.9 | 4.5 | 3.3 | 3.0 |
| 60 (1 step) | 4.7 | 5.2 | 2.0 | 3.1 |
| 20 (2 step) | 8.8 | 7.3 | 7.7 | 8.1 |
| 40 (2 step) | 8.5 | 7.2 | 7.8 | 8.0 |
| 60 (2 step) | 11.1 | 10.1 | 10.6 | 12.4 |

EXAMPLE 5

A structure utilizing random 0.5 oz./yd.$^2$ polyester webs and 1-mil ethylene vinylacetate film was prepared in the manner described in Example 2 except that the cardboard was replaced by a layer of silicone foam and a 40-mesh screen was employed. Then tensile strength of the product in the machine direction was 7.3 lbs./in., with 17.2% elongation at break after the first pressing and 10.7 lbs./in., with 32.3% elongation at break after the second pressing. Cross-machine direction tensile strengths were 5.8 lbs./in., with 18.9% elongation at break and 10.1 lbs./in., with 49.5% elongation at break respectively.

EXAMPLE 6

A 0.5 oz./yd.$^2$ carried web consisting of 85 parts by weight of 1.5 denier, 2 in. rayon fibers and 15 parts by weight of 3-denier, 3 in. polyester fibers was placed on each side of a 1-mil ethylene vinylacetate film and pressed together utilizing a 60-mesh screen and the two-step process of Example 2. The tensile strength of the product was 8.9 lbs./in., with 29.2% elongation at break (machine direction) and 4.6 lb./in., with 57.5% elongation at break (cross direction). The respective trapezoid tear strengths were 3.0 lbs. and 4.4 lbs. Air permeability of this structure was 34 cu. ft./sq. ft./min. as determined by ASTM D-737-66 using 12.7 mm. pressure differential.

EXAMPLE 7

A laminate consisting of a 0.5 oz./yd.$^2$, air laid, random web of 50 parts of 1.5 denier, 1½ inch polyester staple fibers and 50 parts of a 60/40 blend of 3-denier and 1.5 denier, 1 9/16 inch rayon fibers on each side of a 1-mil ethylene vinylacetate film was prepared by the two-step procedure of Example 2 utilizing a 40-mesh screen, a platen temperature of 270° F. and pressures of 800 p.s.i. Part of the laminate was treated by being exposed to water at a temperature of 185° F. for 2 minutes and then dried in air. The properties of the untreated laminate (Sample A) and the treated laminate (Sample B) are given in the following table.

TABLE FOR EXAMPLE 7

| | Sample A | Sample B [1] |
|---|---|---|
| Weight (oz./yd.$^2$) | 1.9 | 1.9 |
| Thickness (inch) | .004 | .004 |
| Tensile strength (lbs./in.): | | |
| Machine | 6.1 | 6.7 |
| Cross | 7.1 | 7.1 |
| Elongation (percent): | | |
| Machine | 32.6 | 44.9 |
| Cross | 36.1 | 36.7 |
| Trapezoid tear (lbs.): | | |
| Machine | 4.6 | 4.8 |
| Cross | 4.1 | 3.8 |
| Modulus (lbs./in.): | | |
| Machine | 105 | 71 |
| Cross | 129 | 85 |
| Toughness (in lbs./in.$^2$): | | |
| Machine | 1.0 | 1.5 |
| Cross | 1.3 | 1.3 |
| Air permeablity (cu. ft./sq./ft./min.) | 31 | 37 |
| Flexural rigidity (mg.-cm.) | 327 | 169 |

[1] Sample after it was exposed to water at a temperature of 185° F. for 2 minutes and dried in air.

The treated sample exhibited excellent drape and textile-like qualities. As seen from the above data the hot water treatment greatly reduced the flexural rigidity of the laminate, i.e., softened, without any significant damage to the physical strength.

EXAMPLE 8

A structure was prepared utilizing a carded web made from 1.5 denier, 2-inch rayon staple fiber and combined with a 1-mil ethylene vinylacetate film in the manner described in Example 2. The overall flexural rigidity of this sample was measured as 173 mg.-cm. Treatment of the sample with 185° F. water followed by drying reduced the flexural rigidity to a value of 39 mg.-cm. The sample exhibited excellent drape and softness. The air permeability increased from 22 to 48 cu. ft./sq. ft./min. and a significant increase in toughness also resulted.

EXAMPLE 9

Random webs of the type used in Example 3 were combined with ethylene vinylacetate film in a continuous operation utilizing a heated roll engraved with the configuration of a woven screen on one side of the laminate and a belt covered with a compressible material on the other side. The speed of the roll was 10 yards per minute and the roll temperature was 300° F. Pressure was 300° p.s.i. The tensile strength of the 1.8 oz./yd.$^2$ structure was 5.4 lbs./in., in the machine direction and the elongation was 48.7%. When the structure was passed through a second pressing on the other side, the tensile strength increased to 9.0 lbs./in. and elongation to 54.1%.

EXAMPLE 10

A 1-mil film comprised of ethylene vinylacetate copolymer was placed between two 0.5 oz./yd.$^2$ random webs consisting of 3-denier, 3-inch rayon staple fibers. Combination of these materials was carried out utilizing a two-step process such as described in Example 2, with 20, 40 and 60-mesh screens using a temperature of 270° F. and 800 p.s.i.

Air permeabilities of the structures as determined by ASTM D-737-66 were 93, 84 and 48 cu. ft./sq. ft./min., respectively. When these webs and film were combined by pressing them together at 800 p.s.i. and 270° F. using smooth surfaces as the pressing surfaces, such as aluminum foil, a structure was formed which exhibited an air permeability of 9 cu. ft./sq. ft./min.

EXAMPLE 11

Structures produced by combining two random webs composed of 60 parts by weight of 3-denier 1%6 inch rayon staple and 40 parts by weight of 1.5 denier 1%6 inch rayon staple with a film of ethylene vinylacetate copolymer using the two-step process of Example 2 exhibited air permeabilities of 26 and 14 cu. ft./sq./ft./min. when 20 and 40-mesh screens were used as the pressing surfaces respectively. Use of a smooth pressing surface (aluminum foil substituted for screen) produced a structure with zero air permeability.

For comparative purposes, a run was made replacing the above-described film with a pre-perforated film identified as Delnet P–520 (Hercules, Inc., Wilmington, Del.) which is a net-like polyethylene material having an air permeability of 384 cu. ft./sq. ft./min. A laminate produced by pressing a nonwoven material/film/nonwoven material assembly between smooth surfaces had an air permeability of less than 1 cu. ft./sq. ft./min. This indicates that when a nonwoven material/film/nonwoven material assembly is made with a pre-perforated film using smooth pressing surfaces, the lamination step tends to close the perforations.

EXAMPLE 12

A laminate was prepared from an assembly of a 1-mil ethylene vinylacetate film between two 0.5 oz./yd.$^2$ air laid, random webs containing 75 parts of 3-denier 1½ inch polyester staple and 25 parts of a 60/40 blend of 3-denier and 1.5-denier 1%6 inches rayon. The procedure followed was the same as in Example 2 except that the platen temperature was 270° F. and a 40-mesh screen was used.

The flexural rigidity of the sample was 240 mg.-cm. Treatment with water at 185° F. for 5 minutes resulted in a flexural rigidity of 227 mg.-cm. Similar treatment with an 0.4% emulsion of a mixture of dimethylphthalate and dimethylisophthalate esters in water resulted in a reduction of the flexural rigidity to a value of 77 mg.-cm.

EXAMPLE 13

A laminate was prepared from an assembly of a 1-mil film of polypropylene placed between two 0.5 oz./yd.$^2$ air laid random webs of 6-denier 1½ inch polypropylene staple fiber. The procedure was the same as in Example 2 except that the platen temperature was 325° F. and the pressure was 600 p.s.i. The product thus prepared has excellent strength and stability.

EXAMPLE 14

A laminate was prepared from an assembly of a 1-mil film of thermoplastic polyurethane placed between two 0.5 oz./yd.$^2$ carded webs of cotton fiber. The procedure followed was the same as in Example 2 except that the platen temperature was 270° F. and a 20 mesh screen was used. The resulting structure had a textile-like fibrous surface which was highly hydrophilic and which could be dyed with conventional cotton dyestuffs.

EXAMPLE 15

A laminate was prepared from an assembly of a 1-mil film of ethylene acrylic acid copolymer placed between two 0.5 oz./yd.$^2$ carded webs of 65 parts of 3 denier 1½ inch polyester fibers and 35 parts of cotton staple fiber. The procedure used was the same as in Example 2. The resultant product had excellent tensile strength and cover.

It will be apparent that many modifications and variations can be effected without departing from the scope of the novel concepts of the present invention, and the illustrative details disclosed are not to be construed as imposing unnecessary limitations on the invention.

What is claimed is:

1. A continuous method of preparing an air-permeable laminated material comprising forming an assembly of a thermoplastic film of substantially uniform thickness and at least one layer of nonwoven fibrous material capable of withstanding exposure to the softening temperature of the thermoplastic film without substantial damage thereto; pressing said assembly between a surface made of compressible material and a patterned surface having a multiplicity of closely spaced, discontinuous raised areas thereon, with said patterned surface always directly contacting a layer of nonwoven fibrous material and, while applying said pressure, heating said assembly at a temperature and for a time sufficient to soften at least those portions of the thermoplastic film in closest proximity to the raised areas of the patterned surface and to form a multiplicity of closely spaced perforations solely within said thermoplastic film while simultaneously bonding said thermoplastic film to said fibrous material.

2. A continuous method of preparing an air-permeable laminated material comprising forming an assembly of two layers of nonwoven fibrous material with a thermoplastic film of substantially uniform thickness therebetween, said fibrous layers being capable of withstanding exposure to the softening temperature of the thermoplastic film without substantial damage thereto; pressing said assembly between a surface made of compressible material and a patterned surface having a multiplicity of closely spaced, discontinuous raised areas which are pressed into the fibrous layer in direct contact therewith; and, while applying said pressure, heating said assembly at a temperature and for a time sufficient to soften at least those portions of the thermoplastic film in closest proximity to the raised areas of the patterned pressure surface and to form a multiplicity of closely spaced perforations solely within said thermoplastic film while simultaneously bonding said thermoplastic film to said layers of fibrous material thereby producing an air-permeable laminated material.

3. A method as claimed in claim 2 wherein the laminated material is subjected to an additional pressure step between a surface of compressible material and a patterned surface having a multiplicity of closely spaced, discontinuous raised areas thereon, contacting the side of the laminate previously contacted by a patterned surface with the surface of compressible material, said additional pressure being applied while heating the thermoplastic film at a temperature and for a time sufficient to soften at least those portions of said thermoplastic film in closest proximity to the raised areas of said patterned surface.

4. A method as claimed in claim 2 wherein said patterned surface has a woven screen configuration.

5. A method as claimed in claim 2 wherein the hand and drape characteristics of said laminated material are improved by contacting said laminated material with a hot liquid which is at a temperature at least as high as the temperature at which the thermoplastic film in said laminated material begins to soften.

6. A method as claimed in claim 2 wherein during said application of pressure, heat is applied to said assembly from said pressure surface having a multiplicity of raised areas.

7. A continuous method of preparing an air-permeable laminated material having the pattern of a woven screen impressed into one side thereof comprising forming an assembly of two layers of nonwoven fibrous material with a thermoplastic film of substantially uniform thickness therebetween, said fibrous layers being capable of withstanding exposure to the softening temperature of the thermoplastic film without substantial damage thereto; pressing said assembly between a surface made of compressible material and a heated patterned surface having a woven screen configuration; applying sufficient pressure to press the raised areas of the patterned surface into the fibrous layer in direct contact therewith; and, while applying said pressure, heating said assembly at a temperature and for a time sufficient to soften at least those portions of the thermoplastic film in closest proximity to the raised areas of the patterned pressure surface and to form a multiplicity of closely spaced perforations solely within said thermoplastic film while simultaneously bonding said thermoplastic film to said layers of fibrous material.

8. A continuous method of preparing an air-permeable laminated material having the pattern of a woven screen impressed into both sides thereof comprising forming an assembly of two layers of nonwoven fibrous material with a thermoplastic film of substantially uniform thickness therebetween, said fibrous layers being capable of withstanding exposure to the softening temperature of the thermoplastic film without substantial damage thereto; pressing said assembly between a surface made of compressible material and a heated patterned surface having a woven screen configuration; applying sufficient pressure to press the raised areas of the patterned surface into the fibrous layer in direct contact therewith; and, while applying said pressure, heating said assembly at a temperature and for a time sufficient to soften at least those portions of the thermoplastic film in closest proximity to the raised areas of the patterned pressure surface and to form a multiplicity of closely spaced perforations solely within said thermoplastic film while simultaneously bonding said thermoplastic film to said layers of nonwoven fibrous material to give a laminated material having the pattern of a woven screen impressed into one side; and subjecting the laminated material to an additional pressure step between a patterned surface and a compressible surface in which the other side of the laminated material is contacted with a patterned surface having a woven screen configuration, applying sufficient pressure to press the raised areas of the patterned surface into said other side of said laminated material and, while applying said pressure, heating said assembly at a temperature and for a time sufficient to soften at least those portions of the thermoplastic film in closest proximity to the raised areas of the patterned pressure surface.

9. A method as claimed in claim 8 wherein the hand and drape characteristics of said laminated material are improved by contacting said material with a liquid which is at a temperature at least as high as the temperature at which the thermoplastic component of said laminated material begins to soften.

10. A method as claimed in claim 9 wherein said laminated material comprises a fiber which is swollen by said hot liquid.

11. A method as claimed in claim 8 wherein said liquid is water.

References Cited

UNITED STATES PATENTS

| | | | |
|---|---|---|---|
| 2,523,022 | 9/1950 | Horstman | 156—309 X |
| 2,543,101 | 2/1951 | Francis | 161—150 X |
| 3,292,619 | 12/1966 | Egler | 161—113 X |
| 3,478,141 | 11/1969 | Dempsey et al. | 161—73 X |
| 3,536,573 | 10/1970 | Van Nest | 8—147 X |
| 3,542,634 | 11/1970 | Such et al. | 161—124 X |
| 3,575,764 | 4/1971 | McFarren | 156—309 |
| 3,530,023 | 9/1970 | Schutte et al. | 161—148 X |

FOREIGN PATENTS 1,063,066   3/1967   Great Britain.

ROBERT F. BURNETT, Primary Examiner

R. L. MAY, Assistant Examiner

U.S. Cl. X.R.

156—219, 222, 290, 324, 309; 161—114